(12) United States Patent
Jing

(10) Patent No.: US 9,276,436 B2
(45) Date of Patent: Mar. 1, 2016

(54) WIRELESS CHARGER FOR MOBILE DEVICES WITH FLEXIBLE PLATFORM AND METHOD

(71) Applicant: Silicon Spread Corporation, San Jose, CA (US)

(72) Inventor: Tao Jing, Fremont, CA (US)

(73) Assignee: Silicon Spread Corporation, San Jose, CA (US)

( * ) Notice: Subject to any disclaimer, the term of this patent is extended or adjusted under 35 U.S.C. 154(b) by 160 days.

(21) Appl. No.: 14/076,003

(22) Filed: Nov. 8, 2013

(65) Prior Publication Data
US 2015/0130406 A1    May 14, 2015

(51) Int. Cl.
*H02J 7/02*    (2006.01)
*H02J 7/00*    (2006.01)

(52) U.S. Cl.
CPC ............... *H02J 7/025* (2013.01); *H02J 7/0042* (2013.01); *H02J 7/0052* (2013.01)

(58) Field of Classification Search
CPC ....................................................... H02J 7/025
USPC ......................................................... 329/108
See application file for complete search history.

(56) References Cited

U.S. PATENT DOCUMENTS

| 5,666,605 | A | 9/1997 | Tokimatsu et al. |
| 6,972,543 | B1 | 12/2005 | Wells |
| 7,392,068 | B2 | 6/2008 | Dayan et al. |
| 2006/0145658 | A1 | 7/2006 | Wang |
| 2010/0012725 | A1 | 1/2010 | Zemba et al. |
| 2013/0036906 | A1 | 2/2013 | Dunn |
| 2014/0055078 | A1 | 2/2014 | Jing |
| 2014/0194160 | A1 | 7/2014 | Jing et al. |
| 2014/0266026 | A1* | 9/2014 | Dowd et al. ............... 320/108 |
| 2014/0283686 | A1 | 9/2014 | Dunn |

* cited by examiner

*Primary Examiner* — Thuan Do
(74) *Attorney, Agent, or Firm* — Edward C. Kwok; Hogan Lovells US LLP

(57) ABSTRACT

A wireless charger and a method allow the wireless charger to have enhanced portability and a smaller footprint when not performing the charging function. The wireless charger includes a charging circuit providing power on one or more power lines, a housing for the wireless charger, and a flexible platform that includes a charging surface with two or more contact electrodes. The flexible platform may be unfolded or unrolled for charging a mobile device, and folded up or rolled up to achieve a smaller footprint, when not performing a charging operation. The wireless charger may further includes a data communication circuit for data communication between a power-line network and the mobile device.

40 Claims, 10 Drawing Sheets

WIRELESS CHARGER FOR MOBILE DEVICES WITH FLEXIBLE PLATFORM AND METHOD

BACKGROUND OF THE INVENTION

1. Field of the Invention

The present invention relates to chargers for mobile devices. In particular, the present invention relates to chargers for mobile devices having a flexible charging platform that can be folded or rolled up for greater compactness and portability.

2. Discussion of the Related Art

Most portable computing devices (e.g., cellular or smart telephones, notebook computable and tablet computers) require frequent recharging, as a relatively small battery size is often key to device compactness and weight. As many such devices can provide only one or two days of useful service between recharging, chargers are also required to be compact and portable, so that a traveler who needs to be away for more than one or two days may be able to bring the charger along.

Generally speaking, there are two types of chargers for mobile devices on the market. The first type requires a cable to connect the mobile device to the charger. The cable designs for this type of chargers are often customized or proprietary, so that a user carrying multiple mobile devices may have to carry multiple chargers. Furthermore, plugging and unplugging the cable to and from the mobile device cause wear and tear on both the connector on the cable and the corresponding connector on the mobile device. As a result, a second type of chargers has appeared. This second type of chargers does not require a cable between the charger and the mobile device. (In this detailed description, a charger that does not require a cable to connect to a mobile device is referred to as a "wireless charger"). Instead, charging is achieved by induction using a changing magnetic field. Efficiency in inductive charging, however, is very low, so that a significant amount of heat is often generated because of the inductive loss. Inductive chargers are also typically bulky and costly.

SUMMARY

According to one embodiment of the present invention, a wireless charger and a method allow the wireless charger to have enhanced portability and smaller footprint when not performing the charging function. The wireless charger includes (a) an interface to an external power source; (b) a charging circuit coupled to receive power from the external power source through the interface, the charging circuit providing power on one or more power lines; (c) an energy storage device (e.g., a battery) coupled to the charging circuit and the charging power lines; (d) a housing for the wireless charger for housing the charging circuit and the energy storage device; and (e) a flexible platform including a charging surface with two or more contact electrodes, wherein the flexible platform has a first physical configuration, in which charging surface is exposed for coupling charging electrodes of a mobile device, and a second physical configuration, in which the flexible platform has a smaller footprint relative to the first physical configuration.

In one embodiment, in the second physical configuration, the flexible platform is rolled up or wrapped around a cylindrical housing. A light source and an on-off switch controlling the light source may be mounted on opposite ends of the cylindrical housing. The interface to the external power source may also be mounted on one end of the cylindrical housing.

In one embodiment, the charging circuit may include a polarity detection circuit that determines the polarities of the contact electrodes when a mobile device is in contact with the charging surface, and wherein the charging circuit couples the charging power lines to the contact electrodes in accordance with the polarities determined. The charging circuit may also include an identification circuit which identifies parameters of a battery in the mobile device. The charging circuit may also include an effectiveness circuit which monitors progress of a charging operation. The charging circuit may also include detection and handling circuits for one or more exceptional conditions, such as over-current, over-voltage, over-charged, or high temperature.

According to one embodiment of the present invention, the wireless charger further includes a data communication circuit for data communication between a power-line network and the mobile device. Data communication on the power lines may be based on analog signals. The data communication circuit may include a first data circuit that is AC-coupled to the power lines to mediate data signals between the wireless charger and the power-line network. AC-coupling may be achieved by blocking capacitors. The first data circuit includes an analog front end circuit that converts data signals from the wireless charger to analog form and data signals from the power-line network to digital form. In like manner, the wireless charger further includes a second data circuit AC-coupled to the power lines to mediate data signals between the wireless charger and the mobile device.

The present invention is better understood upon consideration of the detailed description below in conjunction with the drawings.

BRIEF DESCRIPTION OF THE DRAWINGS

To facilitate cross-referencing among the figures, like elements are assigned like reference numerals.

DETAILED DESCRIPTION OF THE PREFERRED EMBODIMENTS

The present invention provides a wireless charger having a flexible charging platform that can be folded or rolled up to make more compact and to enhance portability. In addition, according to one embodiment of the present invention, the wireless charger also provides data communication capability to allow the mobile device to maintain data communication operations while charging.

Figure 1A:
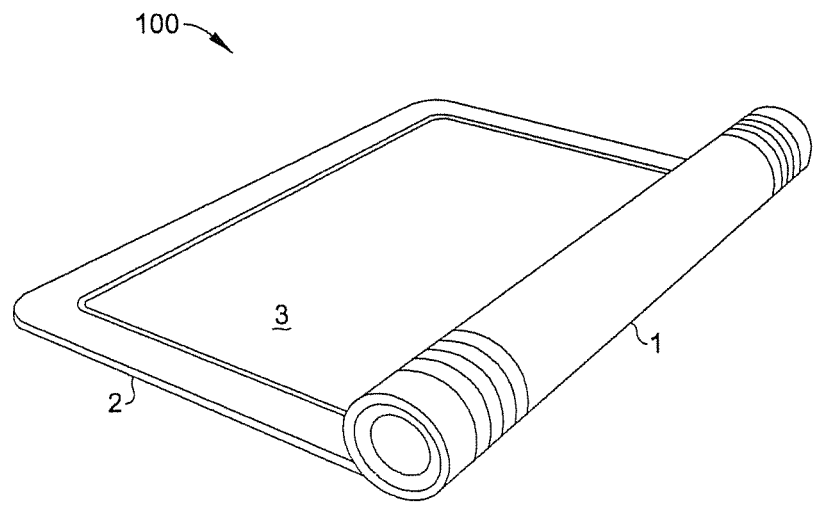
FIGS. 1(a) and 1(b) show wireless charger 100 in unrolled and rolled up configurations, respectively, according to one embodiment of the present invention.
Figure 1B:
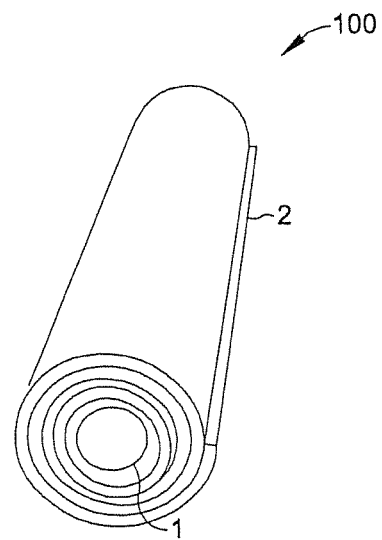

FIG. 1(*a*) shows wireless charger 100, according to one embodiment of the present invention. As shown in FIG. 1(*a*), wireless charger 100 includes cylindrical housing 1 and flexible charging platform 2, which includes charging surface 3 where the electrodes for charging the mobile device are provided. Flexible platform 2 and charging surface 3 are preferably formed out of a flexible material that allows charging platform 2 to be rolled up or wrapped around cylindrical housing 1 in a folded or rolled-up configuration, such as shown in FIG. 1(*b*). In wireless charger 100, charging surface 3 is configured with contact electrodes for contacting charging electrodes of a mobile device. Suitable charging electrodes of the mobile device are typically embedded in a back cover or provided at suitable locations on a planar surface of its housing. This arrangement allows the mobile device to be charged by simply placing the mobile device on the charging surface of the charger. Examples of wireless chargers and mobile devices with such charging arrangements are described, for example, in co-pending U.S. patent applications ("Co-pending Patent Applications"), (i) U.S. patent application Ser. No. 13/734,610, entitled "Wireless Charger Circuit and Method," filed on Jan. 4, 2013, and (ii) U.S. patent application Ser. No. 13/594,673, entitled "Wireless Battery Charger For Mobile Devices and Method Thereof", filed on Aug. 24, 2012. The Co-pending Patent Applications are hereby incorporated by reference in its entirety. The Co-pending Patent Applications describe, for example, a wireless charger which automatically detects the polarities of the mobile device's charging electrodes through the contact electrodes provided on a charging surface, once the mobile device is placed on the charging surface. In that wireless charger, a user need not be concerned about aligning the polarities of the charging electrodes of the mobile device with the polarities of the contact electrodes of the wireless charger. With a wireless charger, wear and tear damage to the charging connector of a mobile device due to frequent plugging and unplugging a charging cable is avoided. When not being used for charging a mobile device, charging surface 3 may be used as a mouse pad.

Figure 2:
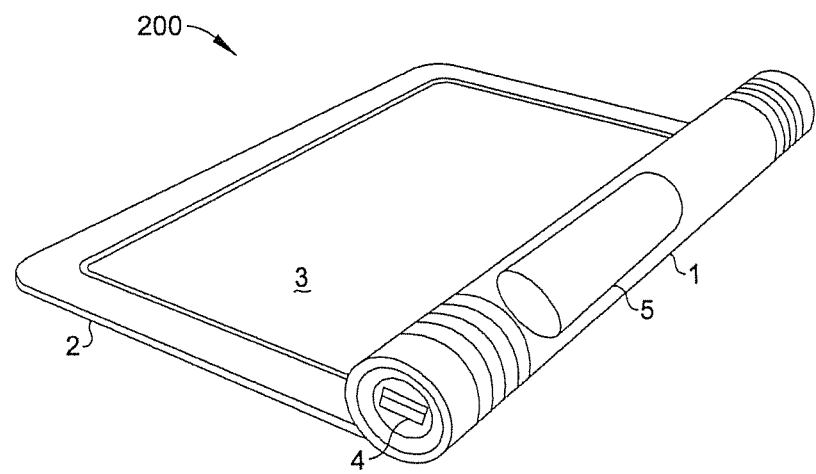
FIG. 2 shows wireless charger 200 including connector 4 for connecting to an external power source, according to one embodiment of the present invention.

FIG. 2 shows wireless charger 200 including connector 4 for connecting to an external power source, according to one embodiment of the present invention. As shown in FIG. 2, connector 4 is provided at one end of cylindrical housing 1. Connector 4 may be an industry standard Universal Serial Bus (USB) connector, or any suitable power connector to a power adapter. The external power source may be an external computational device (a desktop or notebook computer) or a power adapter drawing power from wall socket or a car battery. Wireless charger 200 includes a charging circuit (not shown, but described in conjunction with respect to FIGS. 7(*a*) and 8 below) that charges internal energy storage device 5 (e.g., a lithium ion battery). Power from the external power source charges internal storage device 5. When a mobile device is placed on charging surface 3, power for charging the mobile device may be provided by internal energy storage device 5, when wireless charger 200 is not connected to an external power source. However, when wireless charger 200 is connected to an external power source, the external power source, internal energy storage device 5, or both, may provide power to charge the mobile device. The placement of connector 4 at one end of cylindrical housing 1 ensures that internal power device 5 may be charged even when wireless charger 200 is in a rolled up configuration.

Figure 3A:
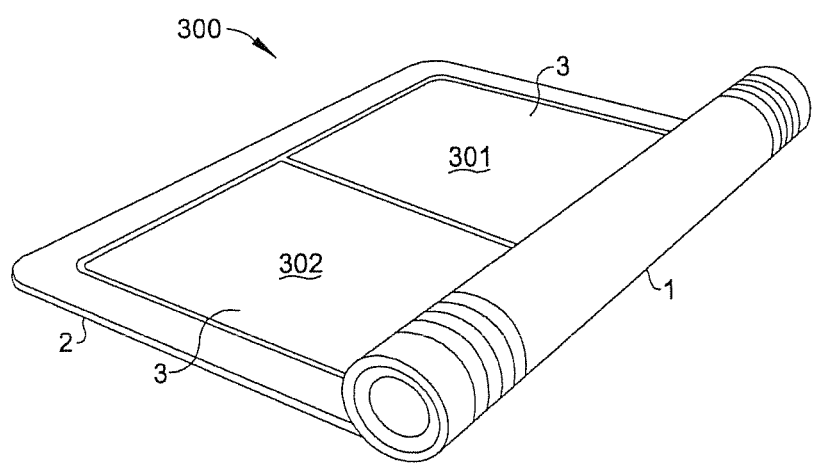
FIG. 3(a) shows wireless charger 300 having contact electrodes 301 and 302 provided on charging surface 3, in accordance with one embodiment of the present invention.
Figure 3B:
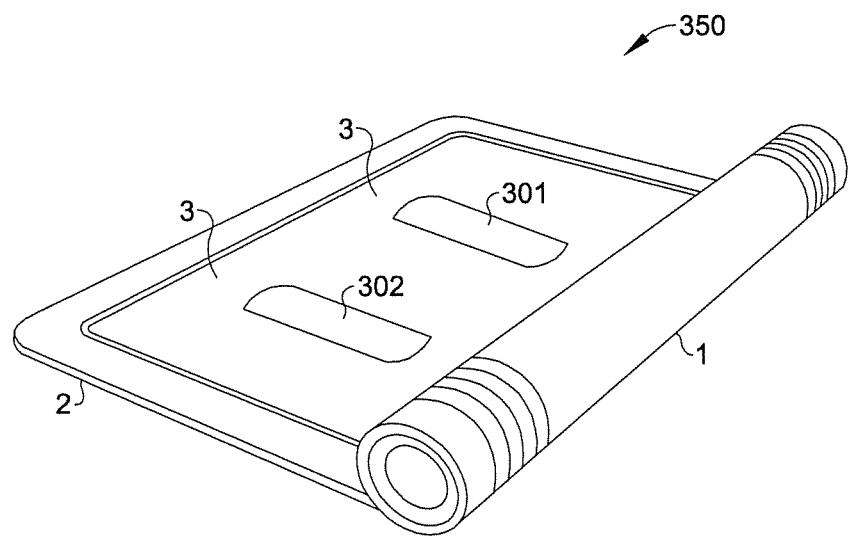
FIG. 3(b) shows wireless charger 350 having contact electrodes 301 and 302 provided on charging surface 3, in accordance with one embodiment of the present invention.

FIG. 3(*a*) shows wireless charger 300 having contact electrodes 301 and 302 provided on charging surface 3, in accordance with one embodiment of the present invention. As shown in FIG. 3(*a*), contact electrodes 301 and 302 have relatively large surface areas to contact the charging electrodes of a mobile device. Contact electrodes 301 and 302 may each be provided, for example, by a conductive polymeric or plastic material or a conductive rubber material, so as to maintain the flexibility of charging platform 2. Conductive polymeric or plastic materials or conductive rubber materials are polymeric, plastic or rubber substrates in which conducting particles or wires are embedded. Alternatively, flexible conductive materials based on grapheme or carbon nanotubes may also be used. Some of these materials have the advantage of providing transparent electrodes, which may render charging surface 3 more esthetically pleasing. Contact electrodes 301 and 302 may be roughened or magnetized to provide a better hold of the mobile device, especially during motion. This roughening allows wireless charger 300 to charge a mobile device in a moving vehicle, drawing power from a car generator or a battery, for example.

FIG. 3(*b*) shows wireless charger 350 having contact electrodes 301 and 302 provided on charging surface 3, in accordance with one embodiment of the present invention. Unlike wireless charger 300 of FIG. 3(*a*), which provides contact electrodes 301 and 302 of large surface areas, wireless charger 350 provides contact electrodes 301 and 302 as conductive strips of suitable smaller extents. As described below, a wireless charger of the present invention may support data communication operations. Conductive strip contact electrodes, such as contact electrodes 301 and 302 of FIG. 3(*b*) may be desirable, as the smaller surface area signal avoids signal attenuation, power dissipation and noise.

Figures 4A, 4B:
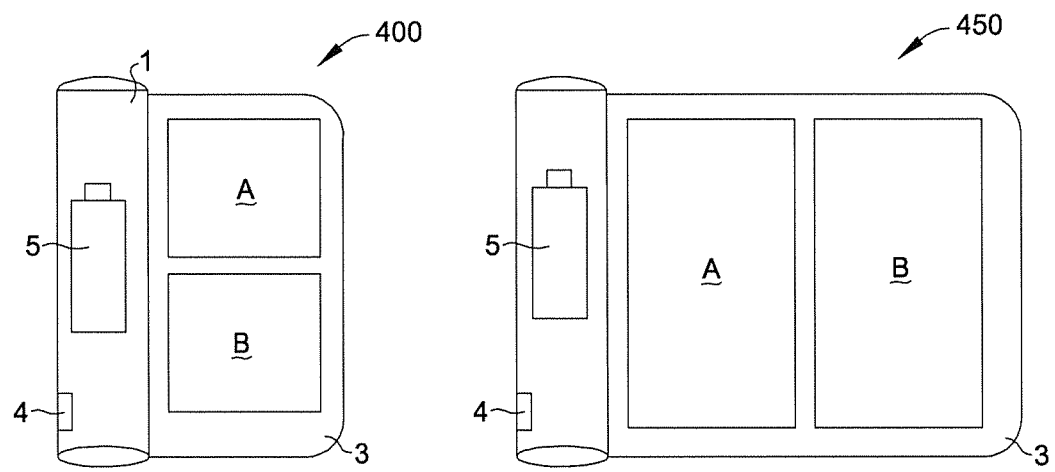
FIGS. 4(a) and 4(b) show wireless chargers 400 and 450, respectively, in accordance with one embodiment of the present invention; each wireless charger having two electrodes A and B, but arranged in orthogonal directions.
Figure 5A:
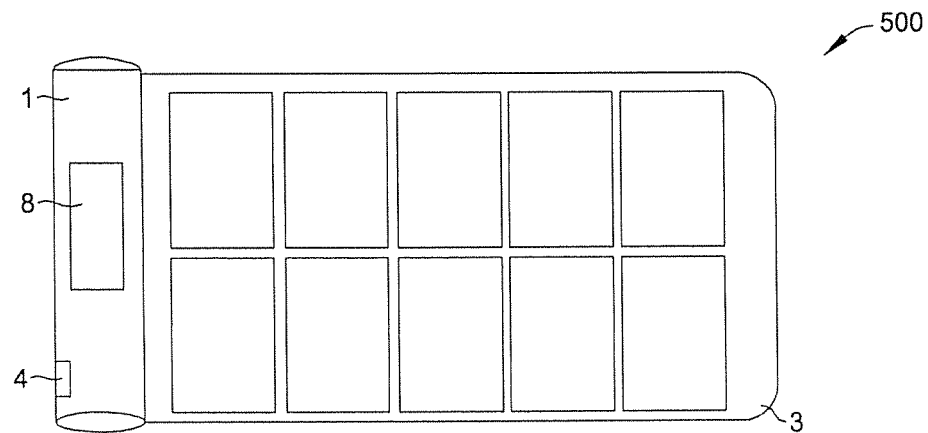
FIGS. 5(a) and 5(b) shows wireless chargers 500 and 550 having more than two contact electrodes arranged different patterns on charging surface 3, in accordance with one embodiment of the present invention.
Figure 5B:
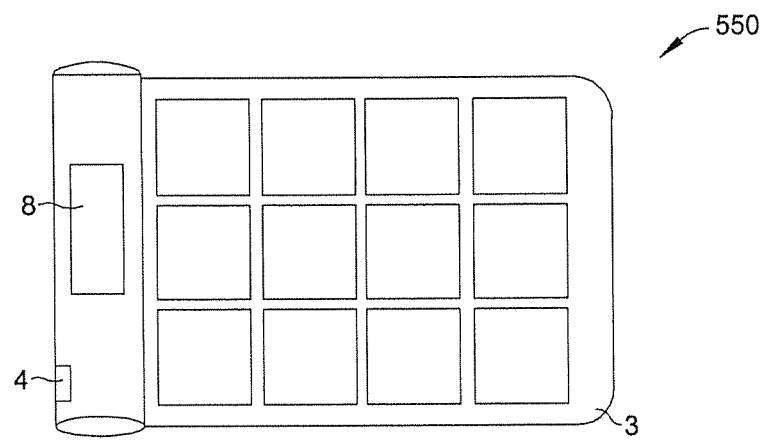

Additional configurations of contact electrodes are shown in FIGS. 4(*a*), 4(*b*), 5(*a*) and 5(*b*). FIGS. 4(*a*) and 4(*b*) show wireless chargers 400 and 450, respectively, in accordance with one embodiment of the present invention; each wireless charger having two electrodes A and B, but arranged in orthogonal directions. Electrodes A and B are provided in FIGS. 4(*a*) and 4(*b*) to perform the contact electrode functions of contact electrodes 301 and 302 described above. Wireless chargers 400 and 450 of FIGS. 4(*a*) and 4(*b*) may also include a light source powered by internal energy storage device 5 in cylindrical housing 1, so that these chargers can also serve as a portable light source (e.g., a flashlight) suitable for mobile use. FIGS. 5(*a*) and 5(*b*) show wireless chargers 500 and 550 having more than two contact electrodes arranged in different patterns on charging surface 3, in accordance with one embodiment of the present invention. As discussed in the Co-pending Pending Applications, having numerous contact electrodes in various arrangements accommodate mobile devices of different sizes and allow charging of numerous mobile devices placed in different orientations simultaneously. FIGS. 5(a) and 5(b) show that wireless chargers 500 and 550 each include circuit board 8 which provides the charging circuit, a control circuit for controlling charging operations, data communication circuits and other circuits.

Figure 6A:
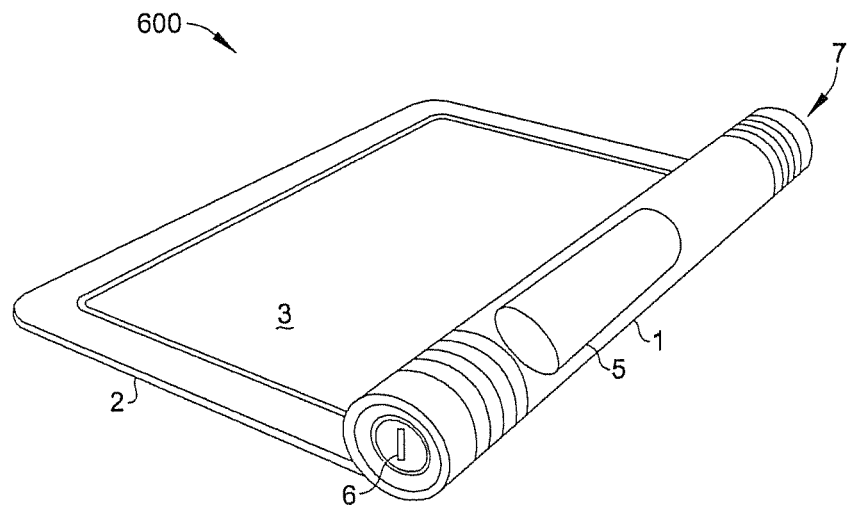
FIGS. 6(a) and 6(b) show wireless chargers 600 and 650, respectively, each providing light source 7, in accordance with one embodiment of the present invention.
Figure 6B:
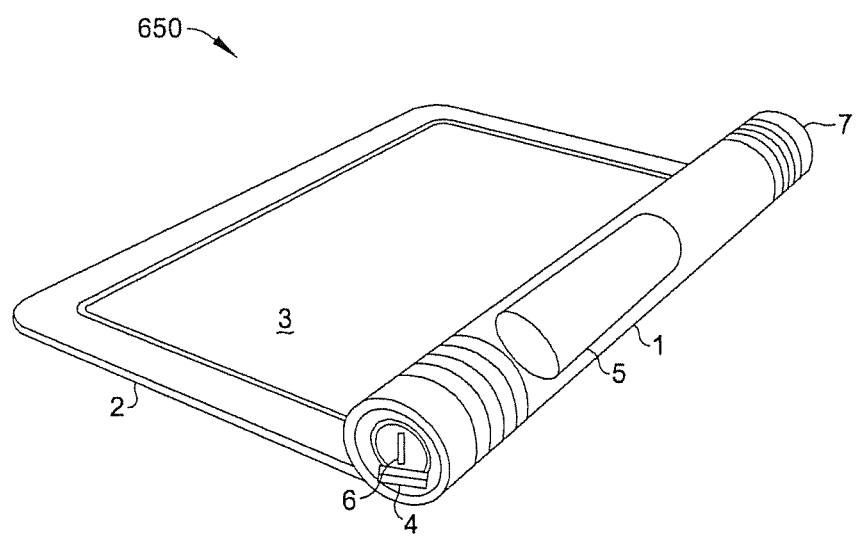

FIGS. 6(a) and 6(b) show wireless chargers 600 and 650, respectively, each providing light source 7, in accordance with one embodiment of the present invention. Light source 7 may include, for example, an incandescent bulb, fluorescent bulb or tube, or an LED bulb, as desired. Light source 7 and its corresponding on-off switch 6 may be placed, for example, on opposite ends of cylindrical housing 1. Placing on-off switch 6 on one end of cylindrical housing 1 allows light source 7 to provide light even when flexible charging platform 2 is extended for charging a mobile device. FIG. 6(b) shows, in addition, connector 4 for connecting to an external power source being provided on the on-off-switch assembly. As a portable device with energy storage, wireless chargers of the present invention are particularly suitable to serve also as light sources for outdoor use, such as at a camp site, at a construction work site or any harsh work environment exposed to the elements.

Figure 7A:
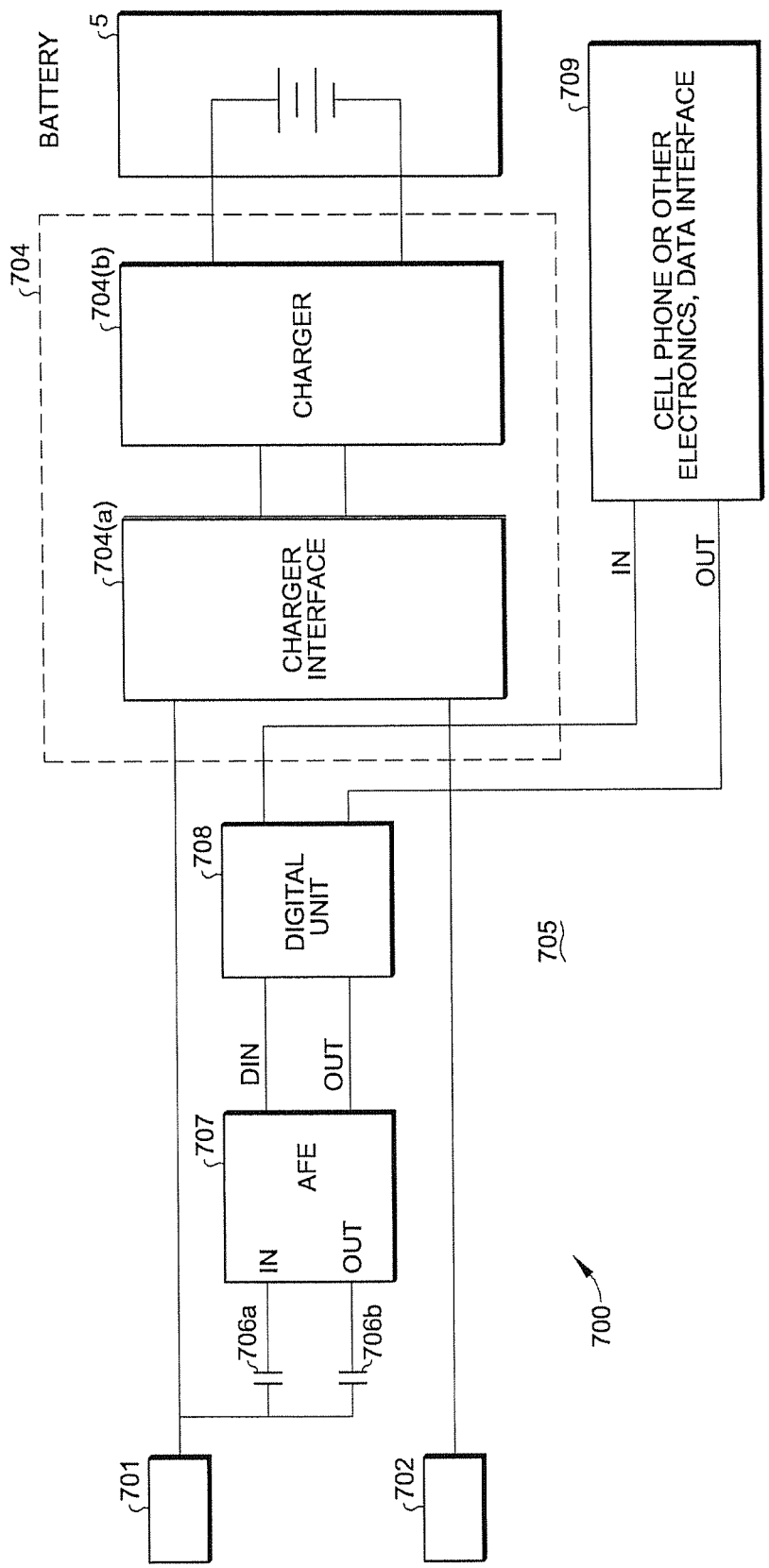
FIG. 7(a) is block diagram showing circuit 700 in a wireless charger, which implements an interface ("receiver") to an external power source, in accordance with one embodiment of the present invention.

FIG. 7(a) is block diagram showing circuit 700 of the wireless charger, which implements an interface to an external power source ("receiver") in a wireless charger, in accordance with one embodiment of the present invention. The wireless charger implemented by circuit 700 supports data communication between the mobile device to be charged and a power-line network residing on the power lines of the external power source. As shown in FIG. 7, circuit 700 receives power line 701 and ground reference 702 from an external power source. Circuit 700 includes (i) charging circuit 704 which includes charging interface and control circuit 704a and charger circuit 704b, and (ii) data communication circuit 705, which includes blocking capacitors 706a and 706b, analog front end (AFE) 707, digital circuit 708, and data interface 709 which connects to the mobile device to be charge through charging electrodes 301 and 302 of the wireless charger.

Figure 8:
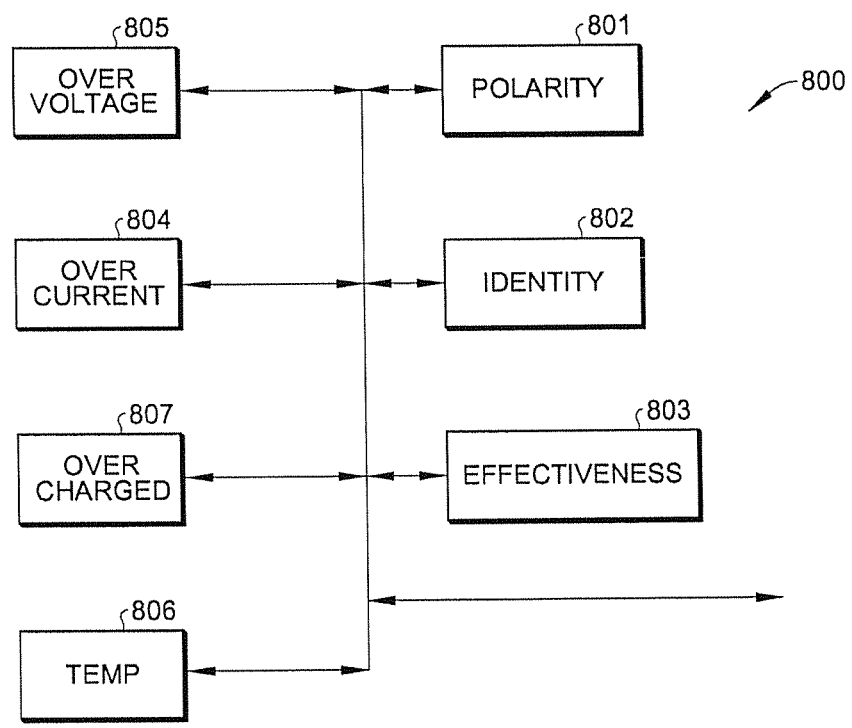
FIG. 8 is a block diagram of circuit 800 implementing charger interface and control circuit 704a, in accordance with one embodiment of the present invention.

FIG. 8 is a block diagram of circuit 800 implementing charger interface and control circuit 704a, in accordance with one embodiment of the present invention. As shown in FIG. 8, circuit 800 include polarity detection and control circuit 801, battery identification and charging control unit 802, charging effectiveness and control unit 803, over-current protection unit 804, over-voltage protection unit 805, over-charged protection unit 807 and temperature control unit 806. Polarity detection and control unit 801 detects the polarities of the charging electrodes of the mobile device through contact electrodes 301 and 302. The detected polarity is then used to configure the switches that connect charger circuit 704b to contact electrodes 301 and 302, so that the mobile device may be charged properly. Battery identification and charging control unit 802 tries to determine if the battery in the mobile device to be charged is one for which a predetermined charging program exists. If so, battery identification and charging control unit 802 runs the predetermined charging program to control charging by charger circuit 704b. Battery identification and charging control unit 802 may also determine the values of battery parameters, such as capacity, charging current limits, charging voltages, and battery chemistry or technology (e.g., a lithium ion battery). Charging effectiveness and control circuit 803 monitors the progress of the charging process, reporting any exceptional condition and terminating the charging process, if appropriate. Exceptional conditions include over-current, over-voltage, over-charged and exceptional high temperature. These exceptional conditions are detected and handled, respectively, by over-current protection unit 804, over-voltage protection unit 805 and temperature control unit 806.

Figure 9:
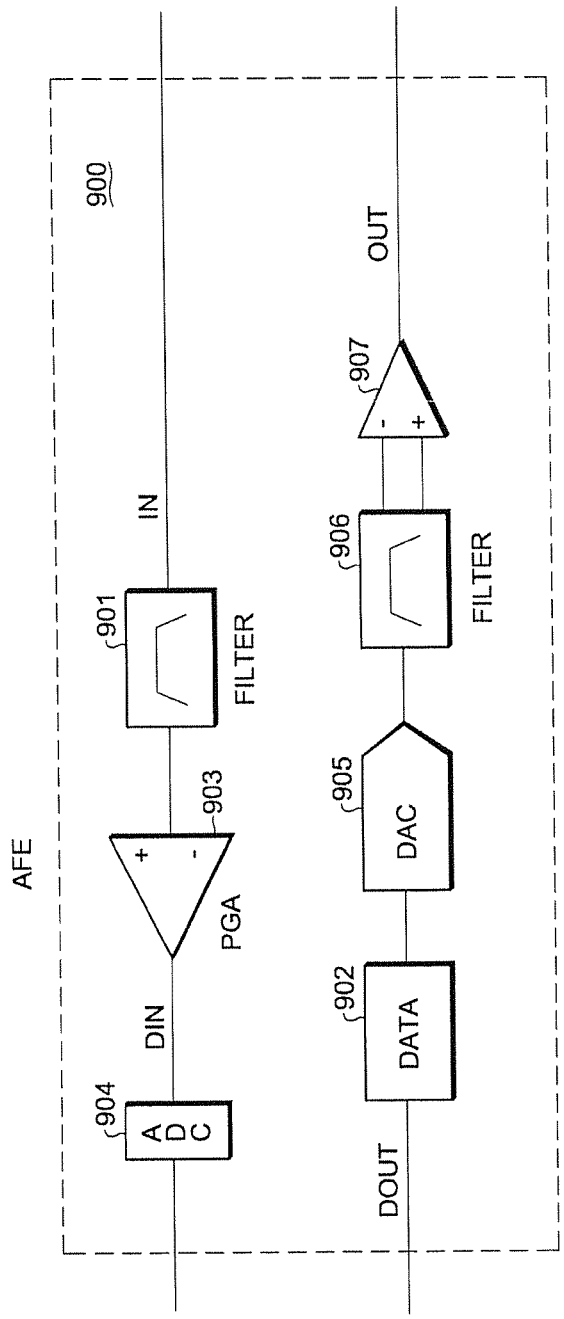
FIG. 9 shows circuit 900 which implements AFE 707 of FIG. 7(*a*).

Returning to FIG. 7(a), data communication over the power-line network is achieved by modulated high frequency data signal riding on the DC voltage across power line 701 and ground reference 702. As shown in FIG. 7, blocking capacitors 706a and 706b pass the high frequency data signal to and from data communication circuit 705. AFE 707 converts an analog data signal from the power-line network into a digital signal for digital circuit 708. In the opposite direction, a digital signal from digital circuit 708 is injected by AFE 707 into the power-line network through power line 701. FIG. 9 shows circuit 900 which implements AFE 707 of FIG. 7(a). A data signal received from the power-line network is first filtered (e.g., down-converted) in filter 901. Programmable gain amplifier (PGA) 903 scales the filtered signal to an appropriate voltage range. The amplified signal is then digitized by an analog-to-digital converter (ADC) 904 for digital circuit 708. In the opposite direction, a data signal from digital circuit 708 is first received into digital circuit 902, and converted to digital form by digital-to-analog converter (DAC) 905 into an analog signal. After proper filtering (e.g., up-converted) in filter 906, the analog signal is attenuated in power amplifier 907 to become a signal of appropriate amplitude range for injection through blocking capacitor 706b into the power-line network. Typically, this amplitude range for data in the power-line network is significantly less than the DC voltage of the power lines.

Figure 7B:
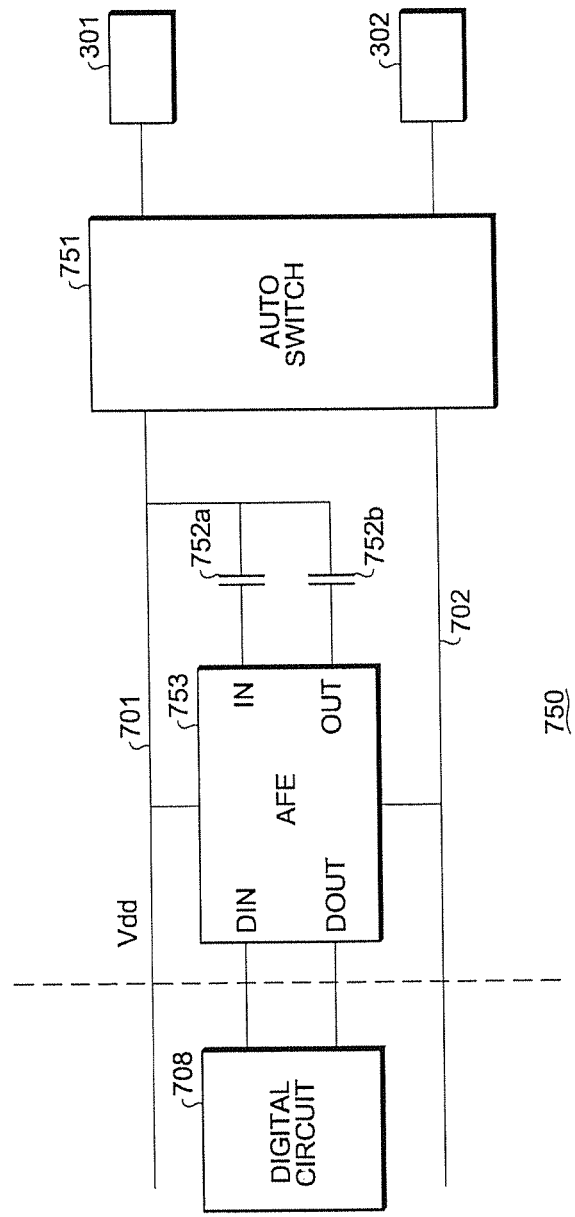
FIG. 7(b) shows circuit 750 of the wireless charger, which implements an interface to the mobile device to be charged ("transmitter"), in accordance with one embodiment of the present invention.

FIG. 7(b) shows circuit 750 of the wireless charger, which implements an interface to the mobile device to be charged ("transmitter"), in accordance with one embodiment of the present invention. As shown in FIG. 7(b), under control of polarity detection and control circuit 801, auto-switch circuit 751 connects power line 701 and ground reference 702 properly to contact electrodes 301 and 302 to provide proper polarities for charging the mobile device. Data communication between the wireless charger and the mobile device is handled by digital circuit 708 through AFE 753, which receives and transmits analog signals of the appropriate amplitude range through blocking capacitors 752a and 752b from and to power line 701, respectively. AFE 753 may be implemented in substantially the same manner as AFE circuit 900 of FIG. 9.

Figure 10:
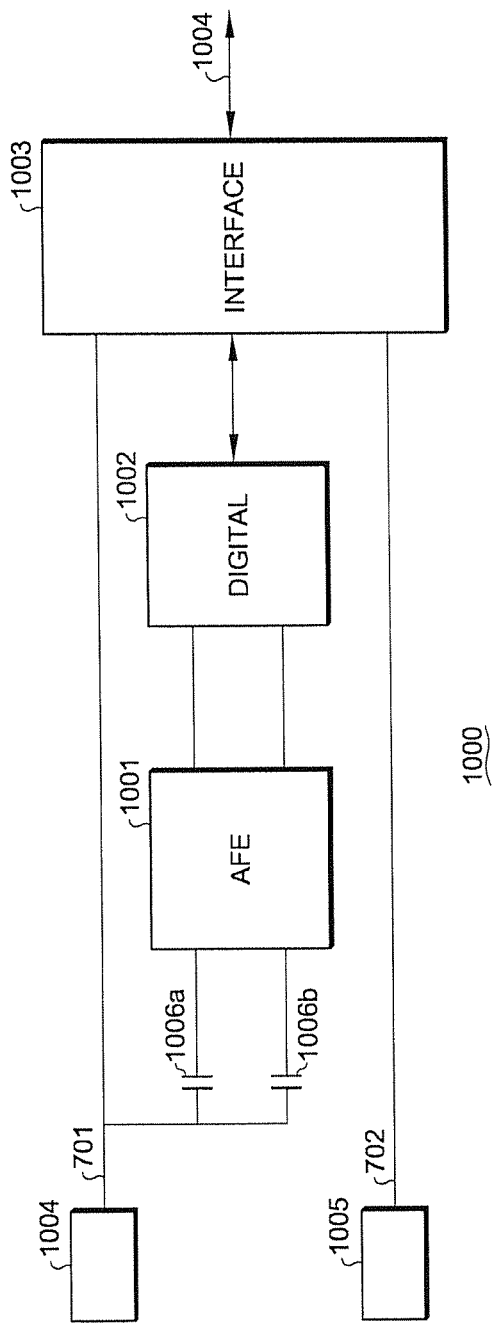
FIG. 10 shows interface circuit 1000 between the mobile device and the wireless charger, in accordance with one embodiment of the present invention.

As discussed in the Co-pending Patent Applications, for a mobile device to be charged by the wireless charger of the present invention, an interface circuit may be required. Such interface circuit may be provided, for example, in a back cover for the mobile device. Charging electrodes may be provided on the back cover to make connection with contact electrodes 301 and 302. One example of such an interface circuit is illustrated by FIG. 10, which shows interface circuit 1000. As shown in FIG. 10, charging electrodes 1004 and 1005 carry power line 701 and ground reference 702, which are coupled with proper polarities to contact electrodes 301 and 302) from the wireless charger. Blocking capacitors 1006a and 1006b pass the data communication signals to and from power line 701. The digital communication signals are provided by digital circuit 1002 through AFE 1001 and may be implemented in substantially the same manner as AFE circuit 900 of FIG. 9. Digital circuit 1002, in turn, handles data communication signals to and from the mobile device through interface 1003, which also provides the charging signals to the mobile device. Interface 1003 may be, for example, an interface connector, which may be an adapter to a proprietary connector to the mobile device.

The above detailed description is provided to illustrate specific embodiments of the present invention and is not intended to be limiting. Numerous modifications and variations within the scope of the present invention are possible. The present invention is set forth in the accompanying claims.

What is claimed is:

1. A wireless charger, comprising:
an interface to an external power source;
a charging circuit coupled to receive power from the external power source through the interface, the charging circuit providing power to one or more power lines;
an energy storage device coupled to the charging circuit and the power lines;
a housing for the wireless charger for housing the charging circuit and the energy storage device; and
a flexible platform including a charging surface that is connected to the power lines, so as to allow the charging surface to receive power from either the charging circuit or the energy storage device, wherein the flexible platform has a first physical configuration, in which the charging surface is exposed for electrically coupling charging electrodes of a mobile device, and a second physical configuration in which the flexible platform is rolled up or folded to make more compact relative to the first physical configuration.

2. The wireless charger of claim 1 wherein, in the second physical configuration, the flexible platform is wrapped around the housing.

3. The wireless charger of claim 1, wherein the housing is cylindrical.

4. The wireless charger of claim 3, further comprising a light source and an on-off switch controlling the light source, the light source and the on-off switch being mounted on opposite ends of the cylindrical housing.

5. The wireless charger of claim 3, wherein the interface to the external power source is mounted on one end of the cylindrical housing.

6. The wireless charger of claim 1, wherein the energy storage device comprises a battery.

7. The wireless charger of claim 1, further comprising a first contact electrode and a second contact electrode mounted on the charging surface.

8. The wireless charger of claim 7, wherein more than two contact electrodes are mounted on the charging surface.

9. The wireless charger of claim 7, wherein the charging circuit comprises a polarity detection circuit that determines the polarities of the first contact electrode and the second contact electrode when a mobile device is in contact with the charging surface, and wherein the charging circuit couples the charging power lines to the first contact electrode and the second contact electrode in accordance with the polarities determined.

10. The wireless charger of claim 7, wherein the charging circuit comprises an identification circuit which identifies parameters of a battery in the mobile device.

11. The wireless charger of claim 7, wherein the charging circuit comprises an effectiveness circuit which monitors progress of a charging operation.

12. The wireless charger of claim 7, wherein the charging circuit comprises detection and handling circuits for one or more exceptional conditions.

13. The wireless charger of claim 12, wherein the exceptional conditions include one or more of: over-current, over-voltage, over-charged, and high temperature.

14. The wireless charger of claim 1, further comprising a data communication circuit for data communication between a power-line network and the mobile device.

15. The wireless charger of claim 14, wherein data communication on the power lines are based on analog signals, and wherein data communication circuit comprises a first data circuit AC-coupled to the power lines to mediate data signals between the wireless charger and the power-line network.

16. The wireless charger of claim 15, wherein the first data circuit is AC-coupled by blocking capacitors.

17. The wireless charger of claim 15, wherein the first data circuit comprises an analog front end circuit that converts data signals from the wireless charger to analog form and data signals from the power-line network to digital form.

18. The wireless charger of claim 15, further comprising a second data circuit AC-coupled to the power lines to mediate data signals between the wireless charger and the mobile device.

19. The wireless charger of claim 18, wherein the second data circuit is AC-coupled by blocking capacitors.

20. The wireless charger of claim 18, wherein the second data circuit comprises an analog front end circuit that convert data signals from the wireless charger to analog form and data signals from the mobile device to digital form.

21. A method for providing a wireless charger, comprising:
providing an interface to an external power source;
coupling a charging circuit so as to receive power from the external power source through the interface, the charging circuit providing power to one or more power lines;
coupling an energy storage device to the charging circuit and the power lines, so as to allow the power provided by the charging circuit to be stored in or discharged from the energy storage device;
enclosing the charging circuit and the energy storage device in a housing for the wireless charger; and
electrically connecting a flexible platform that includes a charging surface to the power lines, so as to allow the charging platform to receive power from either the energy storage device or the charging circuit, wherein the flexible platform has a first physical configuration, in which the charging surface is exposed for electrically coupling charging electrodes of a mobile device, and a second physical configuration, in which the flexible platform is rolled up or folded to make more compact relative to the first physical configuration.

22. The method of claim 21 wherein, in the second physical configuration, the flexible platform is wrapped around the housing.

23. The method of claim 21, wherein the housing is cylindrical.

24. The method of claim 23, further comprising providing a light source and an on-off switch controlling the light source, the light source and the on-off switch being mounted on opposite ends of the cylindrical housing.

25. The method of claim 23, wherein the interface to the external power source is mounted on one end of the cylindrical housing.

26. The method of claim 21, wherein the energy storage device comprises a battery.

27. The method of claim 21, further comprising providing a first contact electrode and a second contact electrode mounted on the charging surface.

28. The method of claim 27, wherein more than two contact electrodes are mounted on the charging surface.

29. The method of claim 27, wherein the charging circuit comprises a polarity detection circuit that determines the polarities of the first contact electrode and the second contact electrode when a mobile device is in contact with the charging surface, and wherein the charging circuit couples the charging power lines to the first contact electrode and the second contact electrode in accordance with the polarities determined.

30. The method of claim 27, wherein the charging circuit comprises an identification circuit which identifies parameters of a battery in the mobile device.

31. The method of claim 27, wherein the charging circuit comprises an effectiveness circuit which monitors progress of a charging operation.

32. The method of claim 27, wherein the charging circuit comprises detection and handling circuits for one or more exceptional conditions.

33. The method of claim 32, wherein the exceptional conditions include one or more of: over-current, over-voltage, over-charged, and high temperature.

34. The method of claim 21, further comprising providing a data communication circuit for data communication between a power-line network and the mobile device.

35. The method of claim 34, wherein data communication on the power lines are based on analog signals, and wherein the data communication circuit comprises a first data circuit AC-coupled to the power lines to mediate data signals between the wireless charger and the power-line network.

36. The method of claim 35, wherein the first data circuit is AC-coupled by blocking capacitors.

37. The method of claim 35, wherein the first data circuit comprises an analog front end circuit that converts data signals from the wireless charger to analog form and data signals from the power-line network to digital form.

38. The method of claim 35, further comprising a second data circuit AC-coupled to the power lines to mediate data signals between the wireless charger and the mobile device.

39. The method of claim 38, wherein the second data circuit is AC-coupled by blocking capacitors.

40. The method of claim 38, wherein the second data circuit comprises an analog front end circuit that converts data signals from the wireless charger to analog form and data signals from the mobile device to digital form.

\* \* \* \* \*